United States Patent
Frederiksen et al.

(10) Patent No.: US 8,665,800 B2
(45) Date of Patent: Mar. 4, 2014

(54) UPLINK ALLOCATIONS FOR ACKNOWLEDGEMENT OF DOWNLINK DATA

(75) Inventors: Frank Frederiksen, Hornbaekvej (DK); Troels Kolding, Sneppevej (DK)

(73) Assignee: Nokia Corporation, Espoo (FI)

( * ) Notice: Subject to any disclaimer, the term of this patent is extended or adjusted under 35 U.S.C. 154(b) by 1354 days.

(21) Appl. No.: 11/903,502

(22) Filed: Sep. 21, 2007

(65) Prior Publication Data
US 2008/0080422 A1    Apr. 3, 2008

Related U.S. Application Data

(60) Provisional application No. 60/848,211, filed on Sep. 29, 2006.

(51) Int. Cl.
*H04W 4/00* (2009.01)
*H04W 72/00* (2009.01)

(52) U.S. Cl.
USPC .......................... 370/329; 455/450

(58) Field of Classification Search
USPC ............... 370/329, 235, 335, 389; 455/450
See application file for complete search history.

(56) References Cited

U.S. PATENT DOCUMENTS

| | | | |
|---|---|---|---|
| 2003/0210668 A1* | 11/2003 | Malladi et al. | 370/335 |
| 2005/0213536 A1* | 9/2005 | Virtanen et al. | 370/329 |
| 2005/0213575 A1* | 9/2005 | Shin et al. | 370/389 |
| 2006/0291393 A1* | 12/2006 | Teague et al. | 370/235 |
| 2007/0165566 A1* | 7/2007 | Khan et al. | 370/329 |

FOREIGN PATENT DOCUMENTS

| | | |
|---|---|---|
| EP | 1 852 994 | 11/2007 |
| KR | 10-2005-0044219 | 5/2005 |
| WO | 2007/109634 | 9/2007 |

OTHER PUBLICATIONS

3GPP TR 25.814 V7.1.0 (Sep. 2006), 3$^{rd}$. Generation Partnership Project; Technical Specification Group Radio Access Network; Physical layer aspects for evolved Universal Terrestrial Radio Access (UTRA) (Release 7).

TSG-RAN WG1 LTE Ad Hoc, Helsinki, Finland, Jan. 23-25, 2006; R1-060095; Source: Ericsson; Title: E-UTRA DL—Localized and distributed transmission; Agenda Item: 5.1.2.4; Document for: Discussion and decision.

3GPP TSG-RAN WG1 Meeting #44bis, Athens, Greece, Mar. 27-31, 2006 (Original R1-060305), R1-060777, Source: NTT DoCoMo, Ericsson, Fujitsu, Mitsubishi Electric, Motorola, NEC, Nokia, Panasonic, Sharp, Toshiba Corporation, Title: Distributed FDMA Transmission for Shared Data Channel in E-UTRA Downlink, Agenda Item: 10.1.1, Documented for: Discussion and Decision.

Australian Examination Report dated Aug. 26, 2010 in corresponding Australian Patent Application No. 2007301647 (2 pages).

(Continued)

*Primary Examiner* — Habte Mered
*Assistant Examiner* — Mahmoud Ismail
(74) *Attorney, Agent, or Firm* — Harrington & Smith

(57) ABSTRACT

The specification and drawings present a new method, system, apparatus and software product for implicit signaling and defining uplink allocations for an acknowledgment of downlink data using user downlink resource allocations, e.g., combined with user equipment detection of other user's allocations for data-non-associated signaling of hybrid automatic request process (HARQ) control information. Sequences of the downlink resource allocations are used to pre-define associated uplink control signaling resources.

29 Claims, 5 Drawing Sheets

(56) References Cited

OTHER PUBLICATIONS

Original Korean Office Action (4 pages) and English translation of Korean Office Action (4 pages) mailed Sep. 6, 2010 in corresponding Korean Patent Application No. 2009-7008801 (8 pages total).

English Abstract of Publication No. KR 1020050044219, published May 12, 2005 (1 page).

3GPP TR 25.814 V7.0.0 (Jun. 2006), Technical Report, 3rd Generation Partnership Project; Technical Specification Group Radio Access Network; Physical layer aspects for evolved Universal Terrestrial Radio Access (UTRA) (Release 7), whole document (126 pages total).

2nd Examination Report dated Mar. 4, 2011 in parallel Australian Patent Application No. 2007301647 (2 pages).

Original Korean Office Action (2 pages) and English Translation of Korean Office Action (2 pages) dated Apr. 26, 2011 in parallel Korean Patent Application No. 2009-7008801 (4 pages total).

* cited by examiner

UPLINK ALLOCATIONS FOR ACKNOWLEDGEMENT OF DOWNLINK DATA

PRIORITY AND CROSS-REFERENCE TO RELATED APPLICATION

This application claims priority from U.S. Patent Application Ser. No. 60/848,211, filed on Sep. 29, 2006.

TECHNICAL FIELD

This invention generally relates to communications, e.g., wireless communications, and more specifically to implicit signaling and defining uplink allocations for an acknowledgment of downlink data.

BACKGROUND ART

In a new concept for a long-term evolution (LTE) of 3GPP (3$^{rd}$ Generation Partnership Project), the assumption is that multiple users can be multiplexed in the downlink direction within a single sub-frame, which may have a time duration of 1 ms, or within several consecutive sub-frames. Currently, the working assumption is that a transmission timing interval (TTI) for scheduled transmissions may have a duration of 1 ms. However, there are also discussions on whether it should be possible to have a shorter duration of a single user allocation when having persistent allocations. Current 3GPP terminology states that a 0.5 ms entity is a slot, while a pair of two slots constitutes a subframe, which in turn is the same length as the TTI. One of the expected key features for the LTE is extensive usage of HARQ (hybrid automatic request process) to enable fast recovery of erroneously received data packets. For each transmitted packet, physical resources will be allocated in the uplink so that each allocated user equipment (UE) can transmit ACK/NACK (acknowledgement) information based on its reception. The assumption for the downlink is that the HARQ is asynchronous, but it is expected that the UE's transmission of the ACK/NACK information (can be also referred to as ACK/NACK) will be time-wise tied to the associated downlink transmission. In cases where the UE does not have data to transmit in the uplink at the time of the ACK/NACK (data-non-associated control signaling) transmission, a dedicated physical control channel (e.g., similar to a high speed dedicated physical control channel, HS-DPCCH, for high speed downlink packet access, HSDPA) is assumed to carry the acknowledgement information (e.g., an ACK/NACK bit). Otherwise, in case of data-associated control signaling, the ACK/NACK information can be piggy-bagged to the data transmission. Both the allocation in uplink and downlink will be decided by the Node B.

A number of users multiplexed in downlink may change significantly from one sub-frame to another. Some of the factors contributing to such variations include:

changes in traffic (burstiness) which means that varying number of users have different and fast varying amounts of data to transmit;

issues related to different TTI sizes in uplink and issues of whether TTI size is cell or user specific and if it is paired to the downlink transmission or not;

properties of radio-aware scheduling that cause variations in the number of users allocated per the sub-frame, etc.

For an asymmetrical traffic (or time-shifted as in the case of voice over internet protocol, VoIP), it will often happen that the ACK/NACK needs to be sent in uplink as "data-non-associated" transmission, e.g., on a separate physical channel tied to the downlink allocation. One option would be to reserve "space" for all active UEs, such that they all have a reservation channel for signaling corresponding to ACK/NACK. Since the uplink resources are orthogonal in time/frequency, any unused transmissions (even for control signaling) will imply that system capacity/throughput are wasted whenever such situations occur. In order to reduce a the HARQ related signaling overhead/resource waste, resource assignments for such control signaling messages can be scheduled, but this would lead to excessive overhead in the downlink control signaling.

For the HSDPA, an associated control channel was set up for each data connection (the HS-DPCCH). However, for the LTE, it is assumed that the uplink transmissions will use a single-carrier FDMA (frequency-division multiple access), where the channel resources are inherently orthogonal to the different users, unlike CDMA (code-division multiple access) where all active UEs are transmitting at the same time and frequency, so a pre-reserved control channel in the uplink for acknowledging the downlink data would lead to a loss of uplink capacity if utilization is not 100%.

DISCLOSURE OF THE INVENTION

According to a first aspect of the invention, a method, comprises: receiving a downlink sub-frame comprising a user downlink resource allocation of a plurality of users and data by at least one user equipment from a network element, wherein the user downlink resource allocation comprises a downlink allocation for the at least one user equipment; assigning by the at least one user equipment a control signaling resource on an uplink sub-frame using the user downlink resource allocation in the downlink sub-frame, the uplink sub-frame being transmitted after a predetermined number of sub-frames following the downlink sub-frame; and transmitting the uplink sub-frame comprising an ACK/NACK signal acknowledging receiving the data by the at least one user equipment using information comprised in the control signaling resource.

According further to the first aspect of the invention, the network element may be a node B and the network element and the user equipment may be configured for wireless communications.

According further to the first aspect of the invention, the sub-frame may be 0.5 or 1 milliseconds.

Still further according to the first aspect of the invention, the predetermined number of sub-frames may be an integer of at least a value of one.

According further to the first aspect of the invention, the predetermined number may be provided in a specification.

According still further to the first aspect of the invention, after receiving the downlink sub-frame, the method may further comprise: receiving a further downlink sub-frame comprising a user uplink resource allocation of a further plurality of users for the uplink sub-frame by at least one further user equipment from the network element, wherein the user uplink resource allocation comprises an uplink allocation for the at least one further user equipment, and the further downlink sub-frame being transmitted after the predetermined number of sub-frames following the downlink sub-frame; and transmitting the uplink sub-frame comprising a further ACK/NACK signal acknowledging receiving the data by the at least one further user equipment using the uplink allocation.

According still further to the first aspect of the invention, the downlink sub-frame may further comprise a user uplink resource allocation of a further plurality of users for the uplink sub-frame and the method may further comprise:

receiving the downlink sub-frame further comprising the user uplink resource allocation by at least one further user equipment, wherein the user uplink resource allocation comprises an uplink allocation for the at least one further user equipment; and transmitting the uplink sub-frame comprising a further ACK/NACK signal acknowledging receiving the data by the at least one further user equipment using the uplink allocation.

According yet further still to the first aspect of the invention, the assigning by the at least one user equipment the control signaling resource may be performed using a number of sub-carriers within a physical resource block.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by a component or a combination of components of the at least one user equipment or the network element.

According to a third aspect of the invention, an apparatus, comprises: a receiving/transmitting/processing module, configured to receive a downlink sub-frame comprising data and a user downlink resource allocation of a plurality of users for the downlink sub-frame by at least one user equipment, the user downlink resource allocation in a downlink sub-frame being provided by a network element, wherein the user downlink resource allocation comprises a downlink allocation for the at least one user equipment, and for transmitting an uplink sub-frame comprising an ACK/NACK signal acknowledging receiving the data by the at least one user equipment using a control signaling resource; and an uplink scheduling and signal generating module, configured to assign the control signaling resource on the uplink sub-frame using the user downlink resource allocation in the downlink sub-frame using information comprised in the control signaling resource, the uplink sub-frame being transmitted after a predetermined number of sub-frames following the downlink sub-frame.

According further to the second aspect of the invention, the sub-frame may be 0.5 or 1 milliseconds.

Still further according to the second aspect of the invention, the predetermined number of sub-frames may be an integer of at least a value of one.

According further to the third aspect of the invention, the predetermined number may be provided in a specification.

According still further to the third aspect of the invention, the network equipment may be further configured to provide a user uplink resource allocation of a further plurality of users for the uplink sub-frame in a further downlink sub-frame, the further downlink sub-frame being transmitted after the predetermined number of sub-frames following the downlink sub-frame, and wherein the further downlink sub-frame comprising the user uplink resource allocation for the uplink sub-frame is received by at least one further user equipment, wherein the user uplink resource allocation comprises an uplink allocation for the at least one further user equipment, and wherein the at least one further user equipment is configured to transmit the uplink sub-frame comprising a further ACK/NACK signal acknowledging receiving the data by using the uplink allocation.

According yet further still to the third aspect of the invention, the downlink sub-frame may further comprise a user uplink resource allocation of a further plurality of users for the uplink sub-frame and the downlink sub-frame may be received by at least one further user equipment, wherein the user uplink resource allocation comprises an uplink allocation for the at least one further user equipment; and wherein the at least one further user equipment is configured to transmit the uplink sub-frame comprising a further ACK/NACK signal acknowledging receiving the data by using the uplink allocation.

According further still to the third aspect of the invention, the assigning by the at least one user equipment the control signaling resource may be performed using a number of sub-carriers within a physical resource block.

Yet still further according to the third aspect of the invention, an integrated circuit may comprise the uplink scheduling and signal generating module and the receiving/transmitting/processing module.

Yet further still according to the third aspect of the invention, the apparatus may be a user equipment for wireless communications.

According to a fourth aspect of the invention, a communication system, comprises: a network element, configured to provide a downlink sub-frame comprising a user downlink resource allocation of a plurality of users in a downlink sub-frame by a network element; and at least one user equipment, configured to receive the downlink sub-frame comprising data and the user downlink resource allocation, configured to assign by the at least one user equipment a control signaling resource on an uplink sub-frame using the user downlink resource allocation in the downlink sub-frame, wherein the user downlink resource allocation comprises a downlink allocation for the at least one user equipment, and wherein the uplink sub-frame being transmitted after a predetermined number of sub-frames following the downlink sub-frame, and further configured to transmit the uplink sub-frame comprising an ACK/NACK signal acknowledging receiving the data by the at least one user equipment using information comprised in the control signaling resource.

According further to the fourth aspect of the invention, the network equipment may be further configured to provide a user uplink resource allocation of a further plurality of users for the uplink sub-frame in a further downlink sub-frame, the further downlink sub-frame being transmitted after the predetermined number of sub-frames following the downlink sub-frame, and the system may further comprise: at least one further user equipment, configured to receive the further downlink sub-frame comprising the user uplink resource allocation for the uplink sub-frame, wherein the user uplink resource allocation comprises an uplink allocation for the at least one further user equipment, and configured to transmit the uplink sub-frame comprising a further ACK/NACK signal acknowledging receiving the data using the uplink allocation.

Further according to the fourth aspect of the invention, the downlink sub-frame may further comprise a user uplink resource allocation of a further plurality of users for the uplink sub-frame, and the system may further comprise: at least one further user equipment, configured to receive the downlink sub-frame further comprising the user uplink resource allocation, wherein the user uplink resource allocation comprises an uplink allocation for the at least one further user equipment, and for transmitting the uplink sub-frame comprising a further ACK/NACK signal acknowledging receiving the data using the uplink allocation.

Still further according to the fourth aspect of the invention, the network element may be a Node B and the network element and the user equipment may be configured for wireless communications.

According to a fifth aspect of the invention, a network element, comprises: an allocation and scheduling module, configured to provide a downlink sub-frame comprising data and a user downlink resource allocation of a plurality of users in the downlink sub-frame and a user uplink resource allocation of a plurality of users in an uplink sub-frame, the uplink sub-frame being transmitted after a predetermined number of sub-frames following the downlink sub-frame; and a receiver, configured to receive from at least one user equipment the uplink sub-frame comprising an ACK/NACK signal acknowledging receiving the data by the at least one user equipment.

According further to the fifth aspect of the invention, the ACK/NACK signal may be allocated in the uplink sub-frame using one of: assigning by the at least one user equipment a control signaling resource on the uplink sub-frame for the ACK/NACK signal using the user downlink resource allocation in the downlink sub-frame, and using the user uplink resource allocation in the uplink sub-frame.

Further according to the fifth aspect of the invention, the predetermined number of sub-frames may be at least one of: at least a value of one, and a predetermined number provided in a specification.

According to a sixth aspect of the invention, an apparatus, comprises: means for receiving and transmitting, for receiving a downlink sub-frame comprising data and a user downlink resource allocation of a plurality of users for the downlink sub-frame by at least one user equipment, the user downlink resource allocation in a downlink sub-frame being provided by a network element, wherein the user downlink resource allocation comprises a downlink allocation for the at least one user equipment, and for transmitting an uplink sub-frame comprising an ACK/NACK signal acknowledging receiving the data by the at least one user equipment using a control signaling resource; and means for assigning the control signaling resource on the uplink sub-frame using the user downlink resource allocation in the downlink sub-frame, the uplink sub-frame being transmitted by the means for receiving and transmitting after a predetermined number of sub-frames following the downlink sub-frame.

According further to the sixth aspect of the invention, the predetermined number of sub-frames may be at least one of: at least value of one, and a predetermined number provided in a specification.

According to a seventh aspect of the invention, a method, comprises: providing a downlink sub-frame comprising data and a user downlink resource allocation of a plurality of users in the downlink sub-frame by a network element to at least one user equipment; and receiving by a network element an uplink sub-frame comprising an ACK/NACK signal acknowledging receiving the data by the at least one user equipment, the ACK/NACK signal is provided using information comprised in a control signaling resource, wherein the user downlink resource allocation comprises a downlink allocation for the at least one user equipment, and the control signaling resource is assigned by the at least one user equipment on the uplink sub-frame using the user downlink resource allocation in the downlink sub-frame, and the uplink sub-frame being transmitted after a predetermined number of sub-frames following the downlink sub-frame.

According further to the seventh aspect of the invention, after providing the downlink sub-frame, the method may further comprise: providing a further downlink sub-frame comprising a user uplink resource allocation of a further plurality of users for the uplink sub-frame to at least one further user equipment by the network element, wherein the user uplink resource allocation comprises an uplink allocation for the at least one further user equipment, and the further downlink sub-frame being transmitted after the predetermined number of sub-frames following the downlink sub-frame; and receiving by the network element the uplink sub-frame comprising a further ACK/NACK signal acknowledging receiving the data by the at least one further user equipment using the uplink allocation.

According still further to the sixth aspect of the invention, the downlink sub-frame further may comprise a user uplink resource allocation of a further plurality of users for the uplink sub-frame and the method may further comprise: providing by the network element the downlink sub-frame further comprising the user uplink resource allocation to at least one further user equipment, wherein the user uplink resource allocation comprises an uplink allocation for the at least one further user equipment; and receiving by the network element the uplink sub-frame comprising a further ACK/NACK signal acknowledging receiving the data by the at least one further user equipment using the uplink allocation.

MODES FOR CARRYING OUT THE INVENTION

A new method, system, apparatus and software product are presented for implicit signaling and defining uplink allocations for an acknowledgment of downlink data using user downlink resource allocations, e.g., combined with user equipment (UE) detection of other user's allocations for data-non-associated signaling of HARQ (hybrid automatic request process) control information. According to one embodiment, sequences of the downlink resource allocations are used to pre-define associated uplink control signaling resources. For example, the UE can derive its index of allocation such that this information comprised in the control signaling resource can be mapped into a (physical) resource to use for the uplink transmission.

Figure 1A:
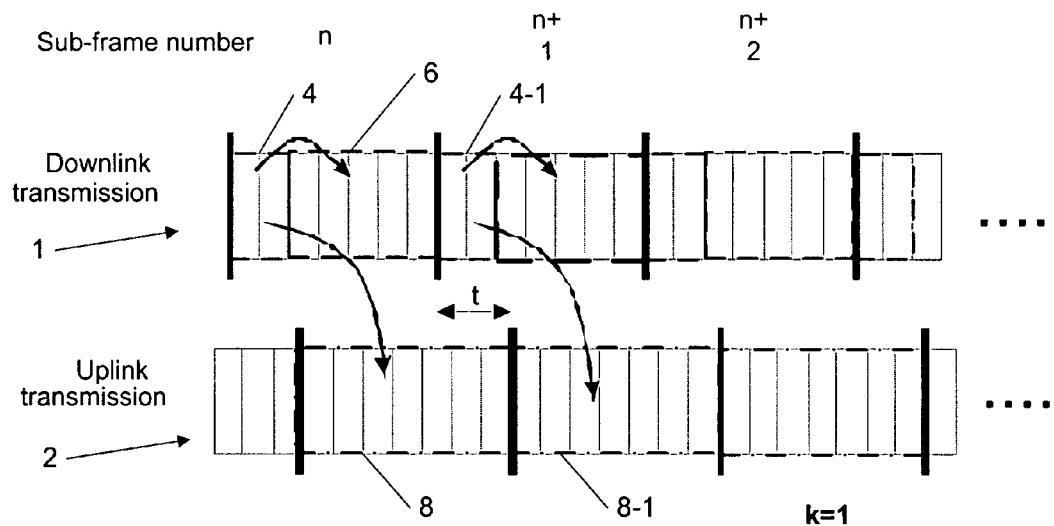
FIGS. 1a and 1b are diagrams demonstrating the resource allocation signaling (FIG. 1a), wherein content of the resource allocation (FIG. 1b) contains information on both uplink and downlink resource allocations, which can be used for defining uplink allocations for acknowledgments of downlink data, according to an embodiment of the present invention.
Figure 1B:
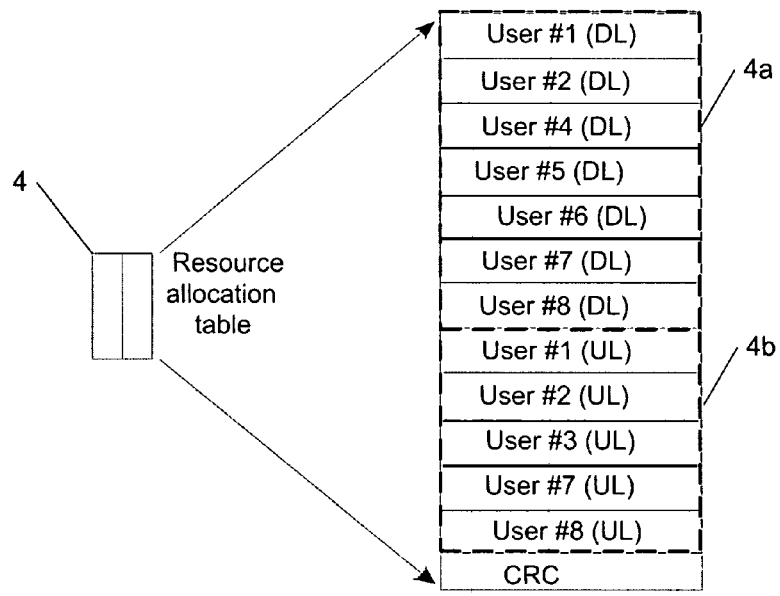

For describing various embodiments of the present invention, data-non-associated ACK/NACK transmissions as the acknowledgments of the downlink data (here "data" is interpreted in a broadest sense meaning any "information") transmissions are considered. It is further assumed that the resource allocation signaling is handled primarily in the downlink direction, such that uplink and downlink allocations are signalled in the downlink, e.g., the Node B can be in full control of all resource allocations. One example among many others of the downlink allocation (or "allocation table")

is shown in FIGS. 1a and 1b, wherein content of the resource allocation (FIG. 1b) contains information on both uplink and downlink resource allocations, which can be used for defining the uplink allocations for the acknowledgments of the downlink data transmissions according to embodiments of the present invention described herein (see Implementation examples 1 and 2 below). The assumption in FIG. 1a is that the downlink transmission is asynchronous, but it is expected that the UE's transmission of the ACK/NACK information can be time-wise tied to the received downlink transmission.

In the example of FIGS. 1a and 1b, there is a set of users 4a allocated for the downlink transmissions and another set of users 4b allocated for the uplink transmissions. Some of these users are downlink only, some are uplink only, and some are both uplink and downlink. Consider the case when a user equipment (UE) is allocated resources for the downlink transmission at a sub-frame 'n'.

For the purpose of the present invention, the TTI (transmission timing interval) and the sub-frame can have a similar meaning. In other words, for the case when TTI is equal to the sub-frame, the example presented in FIGS. 1a and 1b provides identical results. However, if TTI is equal to two sub-frames (or more), then an allocation table is included only in every second sub-frame (e.g., one per TTI). Since the TTI is not currently defined, it is more accurate to refer to a resource allocation table per one TTI in general, as applied to various embodiments of the present invention.

Moreover, a resource allocation table comprising lists 4a and 4b (as well as a cyclic redundancy check CRC, as shown) can be transmitted downlink (DL) during first two slots 4 of a sub-frame n both for the downlink data packet slots 6 and the uplink slots 8 of the uplink sub-frame n (the uplink sub-frame n is delayed relatively to the downlink sub-frame n by a time delay t needed for UE processing). The same is applied to a time slot 4-1 for a sub-frame n+1, and all other downlink sub-frames as shown in FIG. 1a. Alternatively/in addition, a sub-frame may contain 14 OFDM symbols, of which the first 1-3 OFDM symbols may be assigned for carrying the resource allocation information. At the end of sub-frame n, the UE has received the data packet 6 (last 5 time slots of the sub-frame n), and after some data processing it needs to transmit the associated ACK/NACK control signal. This processing delay will cause the ACK/NACK signal to be transmitted at uplink sub-frame 'n+k', where 'k' would typically be defined by a specification (both k and n are integers, k can be a value of one or more) or it can be negotiated between the node B and the UE (e.g., considering the UE capabilities). For example, if k=1 (for the case when the TTI is equal to the sub-frame), then the ACK/NACK signal can be sent on an uplink (UL) sub-frame 8-1, according to embodiments of the present invention described herein. With regards to the data-non-associated control signaling, a solution described herein is "overhead-optimized", such that as little control signaling overhead as possible is needed. Implementation examples 1-3 for providing implicit signaling of resources for data-non-associated ACK/NACK signaling according to various embodiments are presented below.

IMPLEMENTATION EXAMPLE 1

In the example 1, it is presumed that the UE can define its uplink resource allocation for the uplink control signaling from the downlink allocation information, such that the scheduled users all know their allocation order in the downlink at the sub-frame n, and they can use this order or sequence to self-assign resources within an uplink signaling space for the n+k sub-frame to transmit the ACK/NACK signal acknowledging the downlink information (data) received during the slots 6 (see FIG. 1a) of the sub-frame n. This signaling space could be, for instance, a number of sub-carriers within a physical resource block, or it could be a code, in case a CDMA approach is used for the data-non-associated control signaling. The key element here is that the UE can use its resource assignment in the downlink transmitted during the sub-frame n to self-define its uplink control signaling resource during the sub-frame n+k for providing said ACK/NACK signal. In this example, the UE only needs to successfully receive the first allocation table (practically, information associated with the downlink data transmission), e.g., only during the sub-frame n shown in FIG. 1a. It is further noted that in one embodiment of the present invention, the control signaling resource could be a CAZAC (constant amplitude zero auto-correlation) sequence which it transmitted using single carrier transmission on a time-frequency domain resource.

Thus, even if the second allocation table during the n+k sub-frame (e.g., during the sub-frame n+1 for k=1) is not properly received, the UE can assign the uplink control signaling resource for transmitting the ACK/NACK signal during the sub-frame n+k, as described herein, using data-not-associated transmission. Then, it follows that the implementation method 1 can provide: a) ACK/NACK solution without a downlink signaling overhead (since it can be derived from already existing information), and b) the Node B with means for utilizing the dedicated control resources for data in the case wherein only few users are transmitted simultaneously in the downlink. However, there could be wasted transmission resources for the users that are using data-associated transmission for the sub-frame 'n+k', if they have resources allocated for the transmission of the ACK/NACK too (which they may not be aware of since they did not properly receive the second allocation table).

IMPLEMENTATION EXAMPLE 2

In the example 2, the example given in the implementation example 1 is further expanded by presuming that the UE will constantly be monitoring the downlink allocation table such that it will be able to know the user allocations at the sub-frame 'n' and at the sub-frame 'n+k'. Assuming that the users know all allocations, the users, scheduled for the downlink transmission at the sub-frame n, can be separated into two categories: users who are scheduled for the uplink transmissions at the sub-frame n+k and users that are not scheduled for uplink transmissions at the sub-frame n+k (e.g., assuming successfully receiving the slots 4-1 shown in FIG. 1a for k=1, i.e., for the case when the TTI is equal to the sub-frame). Since the non-scheduled users during the subframe n+k all know their allocation order in the downlink at the sub-frame n, they can use this order or sequence to self-assign resources within the uplink signaling 'space' in the sub-frame n+k in the same way as described above in the implementation example 1. The other group of users with the scheduled uplink allocations at the sub-frame n+k can send the ACK/NACK signal using said scheduled uplink allocations. Thus the implementation method 2 can allow Node-B to utilize the unused resources (e.g. if many data associated users or a low number of users are multiplexed). It is noted that the robust operation of the concept in the implementation example 2 is dependent on correct detection of two allocation tables, which may imply more processing and data storage needed in the UE.

IMPLEMENTATION EXAMPLE 3

Figure 2:
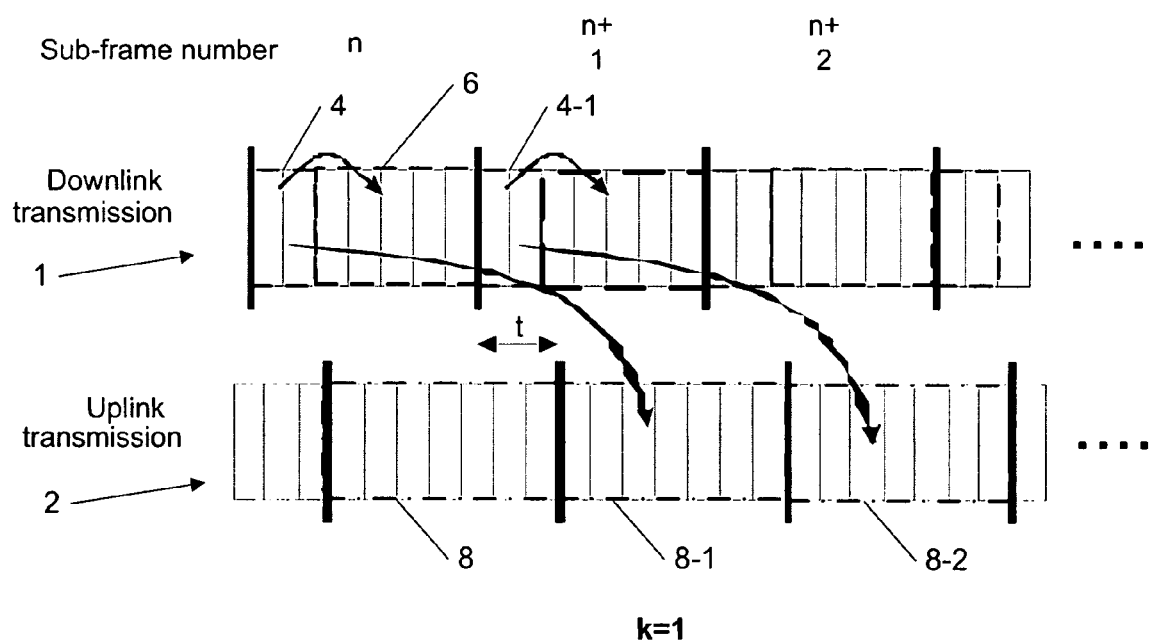
FIG. 2 is a diagram demonstrating the resource allocation signaling by a network element, which can be used for defining uplink allocations for acknowledgments of downlink data, according to an embodiment of the present invention described in an implementation example 3.

In the example 3, the example given in the implementation example 2 is further expanded by assuming that the resource allocation information for the sub-frame n will contain information on the scheduled downlink users at the sub-frame n, while it contains uplink scheduling information for the uplink users at the sub-frame n+k. In this case, the need to decode two allocation tables to obtain the correct allocation information is alleviated. This example implementation is illustrated for the case of k equal to one (i.e., for the case when the TTI is equal to the sub-frame) in FIG. 2. As seen in FIG. 2, the slots 4 of the downlink sub-frame n comprise the uplink resource allocation information for the uplink slots 8-1 of the uplink sub-frame n+1, and the slots 4-1 of the downlink sub-frame n+1 comprise the uplink resource allocation information for the uplink slots 8-2 of the uplink sub-frame n+2, etc. It is noted that the scheduling delay of the uplink scheduled resources will increase by 'k' sub-frames, and it is expected k to be on the order of 1-4 ms (e.g., k can be 1, 2, 4, etc.).

Figure 3:
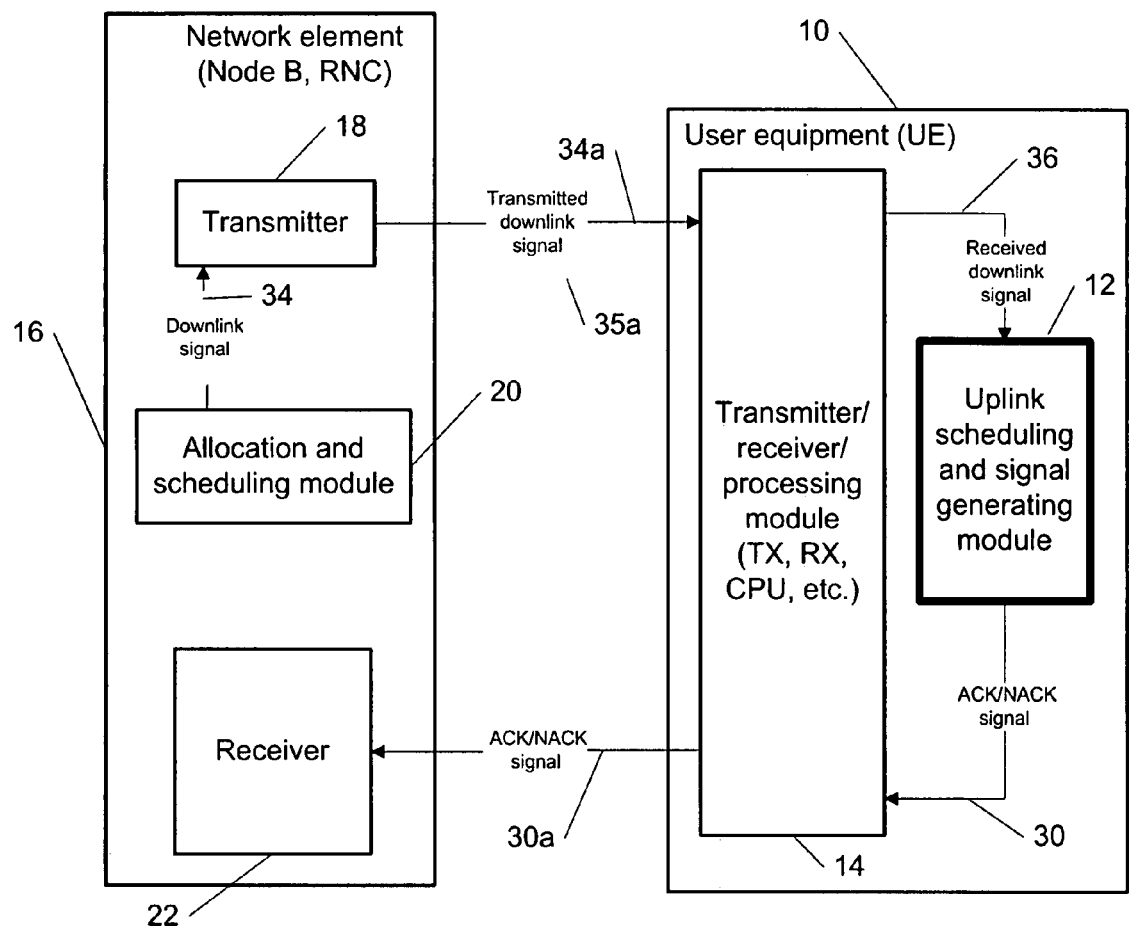
FIG. 3 is a block diagram which demonstrates signaling and defining uplink allocations for an acknowledgment of downlink data, according to embodiments of the present invention.

FIG. 3 shows one example among others of a block diagram which demonstrates signaling and defining uplink allocations for the acknowledgment of the downlink data, according to embodiments of the present invention.

In the example of FIG. 3, a user equipment 10 can comprise an uplink scheduling and signal generating module 12 and a transmitter/receiver/processing module 14. The module 12 can be generally viewed as means for assigning and a structural equivalence (or an equivalent structure) thereof. Also, the module 14 can generally be transmitting and/or receiving means, e.g., a transceiver, or a structural equivalence (or equivalent structure) thereof. The user equipment 10 can be a wireless device, a portable device, a mobile communication device, a mobile phone, etc. In the example of FIG. 3, a network element 16 (e.g., a node B) comprises a transmitter 18, an allocation and scheduling module 20 and a receiver 22.

According to an embodiment of the present invention, the module 12 (the same is applicable to the module 20 and 14) can be implemented as a software or a hardware module or a combination thereof. Furthermore, the module 12 (as well as 20 or 14) can be implemented as a separate block or can be combined with any other standard block or module or it can be split into several blocks according to their functionality. The transmitter/receiver/processing block 14 can be implemented in a plurality of ways and typically can include a transmitter, a receiver and a CPU (central processing unit), etc. The transmitter and receiver can be combined, for example, in one module such as transceiver, as known in the art. The module 14 provides an effective communication of the module 12 with the network element 16 as described below in more detail. All or selected modules of the user equipment 10 can be implemented using an integrated circuit, and all or selected modules of the network element 16 can be implemented using an integrated circuit as well.

A downlink signal 34 (e.g., comprising the allocation slots 4 and the downlink data slots 6 shown in FIG. 1a) from the block 20 is transmitted (see signal 34a) by the transmitter block 18 of the network element 16 to the transmitter/receiver/processing module 14 of the user equipment 10 and then forwarded (see signal 36) to the uplink scheduling and signal generating module 12. The module 12 assigns and provides an ACK/NACK signal 30 according to embodiments of the present invention described herein, which are then forwarded (signals 32a and 32b) to the receiver block 22 of the network element 16.

Figure 4A:
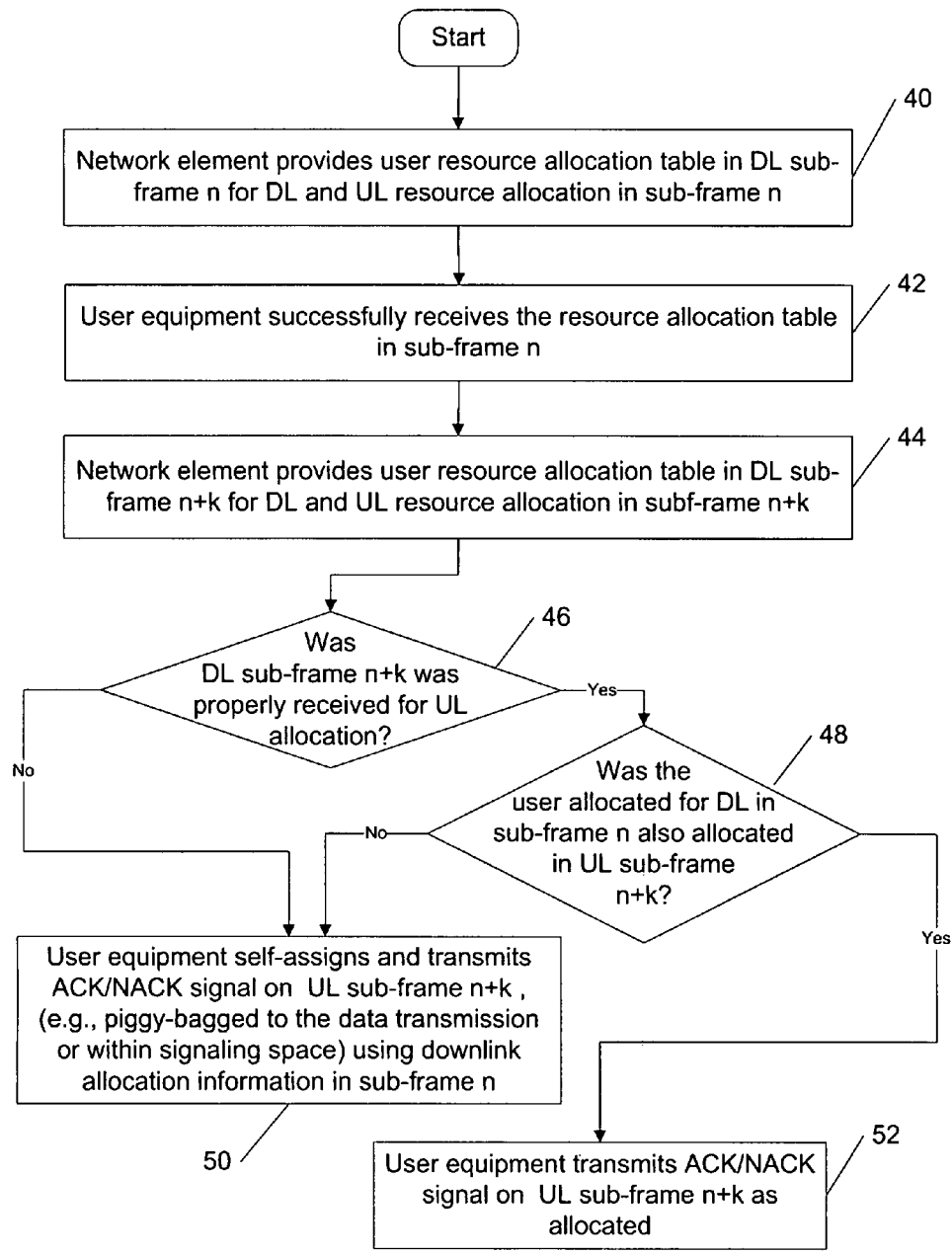
FIGS. 4a and 4b are flow charts demonstrating different implementations (FIG. 4a corresponds to Examples 1 and 2, and FIG. 4b corresponds to Example 3), which demonstrate signaling and defining uplink allocations for acknowledgments of downlink data, according to embodiments of the present invention.

FIG. 4a is a flow chart illustrating implementations corresponding to the implementation examples 1 and 2, which demonstrate signaling and defining uplink allocations for the acknowledgments of downlink transmitted information (data), according to embodiments of the present invention.

The flow chart of FIG. 4a only represents one possible scenario among others. The order of steps shown in FIG. 4a is not absolutely required, so generally, the various steps can be performed out of order. In a method according to an embodiment of the present invention, in a first step 40 the network element provides to the user equipment the user resource allocation table comprised in the downlink sub-frame n for the DL and UL resource allocation in the sub-frame n. In a next step 42, the user equipment successfully receives the resource allocation table for the downlink user allocation in the sub-frame n. In a next step 44, the network element provides to the user equipment the user resource allocation table in the downlink sub-frame n+1 for the DL and UL resource allocation in the sub-frame n+k.

In a next step 46, it is determined whether the downlink sub-frame n+k was properly received for providing to the user the UL resource allocations. If that is not the case, in a next step 50 (this step corresponds to the implementation example 1), the user equipment self-assigns and transmits the ACK/NACK signal on the UL n+k sub-frame (e.g., piggy-bagged to the data transmission or within some signaling space) using the downlink allocation information in the sub-frame n, according to embodiments of the present invention described herein (e.g., see the implementation example 1). If, however, it is determined that the downlink sub-frame n+k was properly received and provided the user UL resource allocations, in a next step 48, it is further determined, whether the user allocated for the DL in the sub-frame n is also allocated for the UL sub-frame n+k (this step corresponds to the implementation example 2). If that is not the case, the process goes to step 50. If, however, it is determined that the user allocated for the DL in the sub-frame n is also allocated for the UL sub-frame n+k, in a next step 52, the user equipment transmits the ACK/NACK signal on the UL sub-frame n+k as allocated.

Figure 4B:
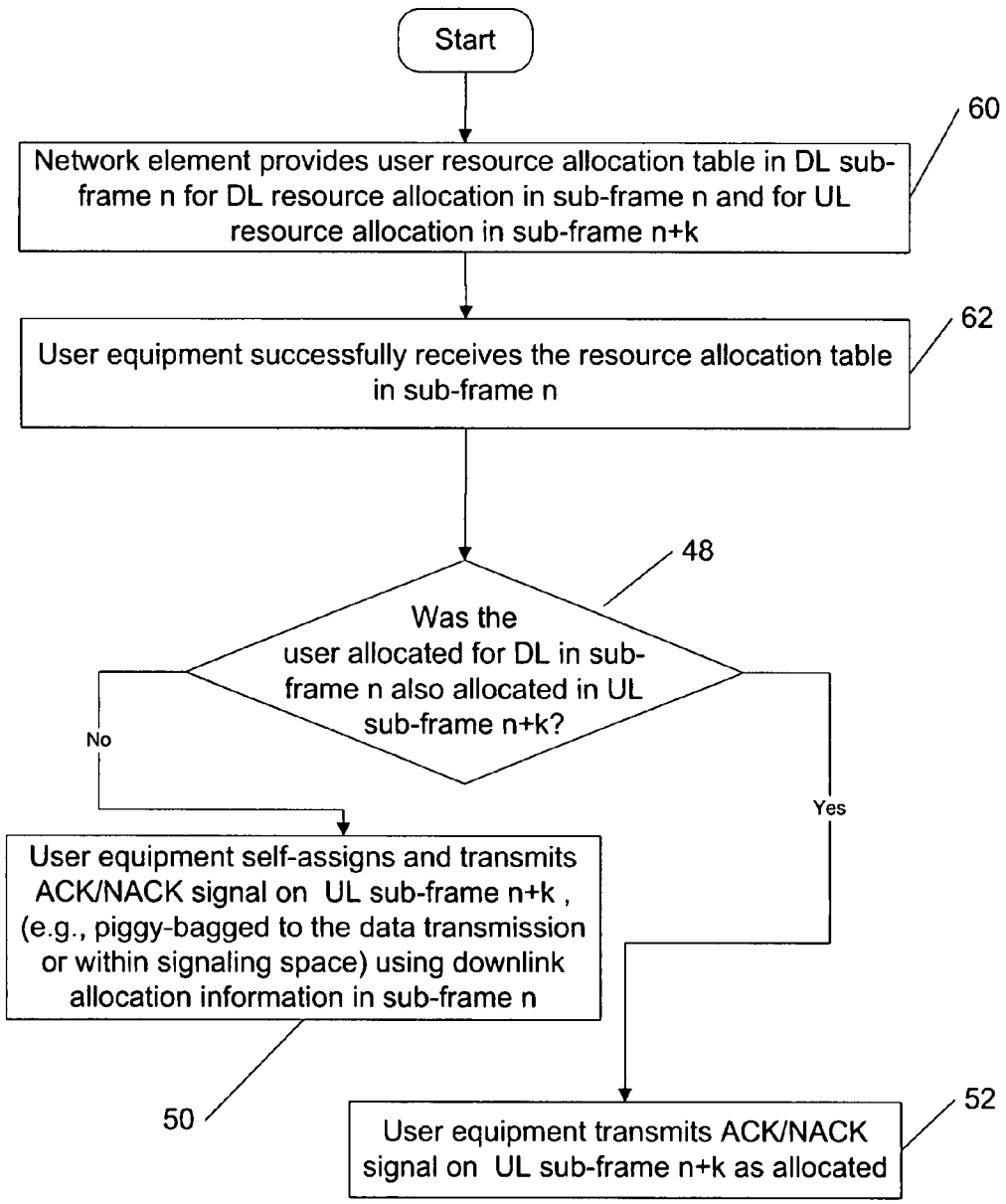

FIG. 4b is a flow chart demonstrating implementations corresponding to the implementation example 3, which demonstrate signaling and defining uplink allocations for acknowledgments of downlink data, according to embodiments of the present invention.

The flow chart of FIG. 4b only represents one possible scenario among others. The order of steps shown in FIG. 4b is not absolutely required, so generally, the various steps can be performed out of order. In a method according to an embodiment of the present invention, in a first step 60 the network element provides to the user equipment the user resource allocation table in the downlink sub-frame n for the DL resource allocation in the sub-frame n and for the UL resource allocation in the sub-frame n+1 (this step corresponds to the implementation example 3). In a next step 62, the user equipment 10 successfully receives the resource allocation table in the sub-frame n. Then the process goes to steps 48, 50 and 52 which are described in regard to FIG. 4a.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
receiving, by at least one user equipment from a network element, a downlink sub-frame comprising a user downlink resource allocation of a set of users, an uplink resource allocation of another set of users, wherein said user downlink resource allocation comprises at least a downlink resource allocation for said at least one user equipment;
transmitting an uplink sub-frame comprising data-non-associated control signalling acknowledging receipt of data by the at least one user equipment using an allocated resource in case said allocated resource is explicitly listed in said uplink resource allocation of said other set of users for the at least one user equipment;
assigning by the at least one user equipment, in case there is no allocated resource explicitly listed in said uplink resource allocation for the at least one user equipment, a control signaling resource on an uplink sub-frame by using said user downlink resource allocation in said downlink sub-frame as implicit signalling of said control signalling resource on the uplink sub-frame, said uplink sub-frame being transmitted after a predetermined number of sub-frames following said downlink sub-frame; and
transmitting said uplink sub-frame comprising an acknowledgement signal acknowledging receiving said data by said at least one user equipment using said control signaling resource.

2. The method of claim 1, wherein said network element is a node B and said network element and said at least one user equipment are configured for wireless communications.

3. The method of claim 1, wherein said sub-frame is 0.5 or 1 milliseconds.

4. The method of claim 1, wherein said predetermined number of sub-frames is an integer of at least a value of one.

5. The method of claim 1, wherein said predetermined number is provided in a specification.

6. The method of claim 1, wherein said user downlink resource allocation is transmitted during at least a first slot of two slots of said downlink sub-frame.

7. The method of claim 1, wherein said downlink sub-frame comprises a first plurality of orthogonal frequency division multiplexed symbols of which a second plurality of symbols are assigned for purposes of resource allocation.

8. The method of claim 1, wherein said assigning by the at least one user equipment said control signaling resource is performed using a number of sub-carriers within a physical resource block.

9. A computer program product comprising: a non-transitory computer readable storage structure embodying computer program code thereon for execution by a computer processor with said computer program code, wherein said computer program code comprises instructions for performing the method of claim 1, indicated as being performed by a component or a combination of components of the at least one user equipment.

10. An apparatus, comprising:
a processor; and
a computer readable storage structure including computer program code configured to, with the processor, cause the apparatus at least to:
receive a downlink sub-frame comprising a user downlink resource allocation of a set of users, an uplink resource allocation of another set of users for said downlink sub-frame, said user downlink resource allocation in a downlink sub-frame being provided by a network element, wherein said user downlink resource allocation comprises at least a downlink resource allocation,
transmit an uplink sub-frame comprising data-non-associated control signalling acknowledging receipt of data by said apparatus using an allocated resource in case said allocated resource is explicitly listed in said uplink resource allocation of said other set of users, and
assign, in case there is no allocated resource explicitly listed in said uplink resource allocation for said apparatus, said control signalling resource to an uplink sub-frame by using said user downlink resource allocation in said downlink sub-frame as implicit signalling of said control signalling resource on the uplink sub-frame, and
transmit said uplink sub-frame comprising an acknowledgement signal acknowledging receipt of said data by said apparatus using said control signalling resource, wherein said uplink sub-frame is transmitted after a predetermined number of sub-frames following said downlink sub-frame.

11. The apparatus of claim 10, wherein said sub-frame is 0.5 or 1 milliseconds.

12. The apparatus of claim 10, wherein said predetermined number of sub-frames is an integer of at least a value of one.

13. The apparatus of claim 10, wherein said predetermined number is provided in a specification.

14. The apparatus of claim 10, wherein said user downlink resource allocation is transmitted during at least a first slot of two slots of said downlink sub-frame.

15. The apparatus of claim 10, wherein said downlink sub-frame comprises a first plurality of orthogonal frequency division multiplexed symbols of which a second plurality of symbols are assigned for purposes of resource allocation.

16. The apparatus of claim 10, wherein control signalling resource assignment by the user equipment is performed using a number of sub-carriers within a physical resource block.

17. The apparatus of claim 10, wherein said apparatus is a user equipment for wireless communications.

18. A communication system, comprising:
a network element, configured to provide a downlink sub-frame comprising a user downlink resource allocation of a set of users, an uplink resource allocation of another set of users for said downlink sub-frame by a network element; and
at least one user equipment, configured to
receive said downlink sub-frame comprising said user downlink resource allocation and said uplink resource allocation of another set of users for said downlink sub-frame, wherein said user downlink resource allocation comprises at least a downlink resource allocation for said user equipment,
transmit an uplink sub-frame comprising data-non-associated control signalling acknowledging receipt of data by said user equipment using an allocated resource in case said allocated resource is explicitly listed in said uplink resource allocation of said other set of users,
assign, in case there is no allocated resource explicitly listed in said uplink resource allocation, said control signaling resource to an uplink sub-frame by using said user downlink resource allocation in said downlink sub-frame as implicit signaling of said control signaling resource on the uplink sub-frame, wherein said uplink sub-frame is transmitted after a predetermined number of sub-frames following said downlink sub-frame, and transmit said uplink sub-frame comprising an acknowledgement signal acknowledging receiving said data by said at least one user equipment using said control signaling resource.

19. The communication system of claim 18, wherein said user downlink resource allocation is transmitted during at least a first slot of two slots of said downlink sub-frame.

20. The communication system of claim 18, wherein said downlink sub-frame comprises a first plurality of orthogonal frequency division multiplexed symbols of which a second plurality of symbols are assigned for purposes of resource allocation.

21. The communication system of claim 18, wherein said network element is a Node B and said network element and said user equipment are configured for wireless communications.

22. An apparatus, comprising:
a processor; and
a computer readable storage structure including computer program code configured to, with the processor, cause the apparatus at least to:
provide a downlink sub-frame comprising a user downlink resource allocation of a set of users in said downlink sub-frame and a user uplink resource allocation of another set of users in an uplink sub-frame, said uplink sub-frame being transmitted after a predetermined number of sub-frames following said downlink sub-frame; and
a receiver, configured to receive from at least one user equipment said uplink sub-frame comprising an acknowledgement signal acknowledging receipt of data by said at least one user equipment wherein, in case said allocated resource is explicitly listed in said uplink resource allocation of said other set of users, said uplink sub-frame comprises data-non-associated control signalling acknowledging receipt of said data by said at least one user equipment using an allocated resource and wherein, in case there is no allocated resource explicitly listed in said uplink resource allocation, said uplink sub-frame comprises a control signalling resource on an uplink sub-frame using said user downlink resource allocation in said downlink sub-frame as implicit signalling of said control signalling resource on said uplink sub-frame, said uplink sub-frame transmitted after a predetermined number of sub-frames following said downlink sub-frame, said uplink sub-frame comprising an acknowledgement signal acknowledging receipt of said data by said user equipment using said control signalling resource.

23. The apparatus of claim 22, wherein said user downlink resource allocation is transmitted during at least a first slot of two slots of said downlink sub-frame.

24. The apparatus of claim 22, wherein said downlink sub-frame comprises a first plurality of orthogonal frequency division multiplexed symbols of which a second plurality of symbols are assigned for purposes of resource allocation.

25. An apparatus, comprising:
means for receiving from a network element a downlink sub-frame comprising a user downlink resource allocation of a set of users, and an uplink resource allocation of another set of users for said downlink sub-frame, wherein said user downlink resource allocation comprises a downlink allocation for said apparatus, and means for transmitting an uplink sub-frame comprising data-non-associated control signalling acknowledging receipt of data by said apparatus using an allocated resource in case said allocated resource is explicitly listed in said uplink resource allocation of said other set of users; and means for assigning, in case there is no allocated resource explicitly listed in said uplink resource allocation, said control signaling resource on said uplink sub-frame using said user downlink resource allocation in said downlink sub-frame as implicit signalling of said control signalling resource on said uplink sub-frame, said uplink sub-frame being transmitted by said means for receiving and transmitting after a predetermined number of sub-frames following said downlink sub-frame, and means for transmitting said uplink sub-frame comprising an acknowledgement signal acknowledging receipt of said data by said apparatus using said control signalling resource.

26. The apparatus of claim 25, wherein said user downlink resource allocation is transmitted during at least a first slot of two slots of said downlink sub-frame.

27. A method, comprising:
providing from a network element a downlink sub-frame comprising a user downlink resource allocation of a set of users, and an uplink resource allocation of another set of users in said downlink sub-frame to at least one user equipment; and
receiving by said network element an uplink sub-frame comprising an acknowledgement signal acknowledging receipt of data by said at least one user equipment, said acknowledgement signal is provided using information comprised in a control signaling resource, wherein
said user downlink resource allocation comprises a downlink allocation for said at least one user equipment, and
in case said uplink resource allocation is explicit, transmitting an uplink sub-frame comprising data-non-associated control signalling acknowledging receipt of said data by said at least one user equipment using an allocated resource listed in said uplink resource allocation of said other set of users, and in case there is no allocated resource explicitly listed in said uplink resource allocation, said control signalling resource is assigned by the at least one user equipment on said uplink sub-frame using said user downlink resource allocation in said downlink sub-frame as implicit signalling of said control signalling resource on said uplink sub-frame, said uplink sub-frame being transmitted after a predetermined number of sub-frames following said downlink sub-frame.

28. The method of claim 27, wherein said user downlink resource allocation is transmitted during at least a first slot of two slots of said downlink sub-frame.

29. The method of claim 28, wherein said downlink sub-frame comprises a first plurality of orthogonal frequency division multiplexed symbols of which a second plurality of symbols are assigned for purposes of resource allocation.

* * * * *